US005422167A

United States Patent [19]

Robertson et al.

[11] Patent Number: 5,422,167

[45] Date of Patent: Jun. 6, 1995

[54] HIGH TEMPERATURE-RESISTANT, THERMALLY-PRINTABLE LABEL FOR ATTACHMENT TO HOT METAL STOCK AND METHOD THEREOF

[75] Inventors: John A. Robertson, Chillicothe; Ken R. Vaughn, Kingston, both of Ohio

[73] Assignee: Infosight Corporation, Chillicothe, Ohio

[21] Appl. No.: 123,323

[22] Filed: Sep. 17, 1993

[51] Int. Cl.6 .................................. B32B 3/00

[52] U.S. Cl. .................................. 428/195; 428/204; 428/209; 428/213; 428/446; 428/450

[58] Field of Search .................. 428/195, 208, 422.8, 428/425.8, 457, 204, 209, 213, 446, 450, 195; 525/479; 427/289

[56] References Cited

U.S. PATENT DOCUMENTS

| | | | |
|---|---|---|---|
| 4,321,290 | 3/1982 | Thams | 427/289 |
| 4,766,185 | 8/1988 | Ryntz et al. | 525/479 |
| 4,775,786 | 10/1988 | Yamano et al. | 235/490 |
| 4,873,298 | 10/1989 | Ryntz | 524/479 |

*Primary Examiner*—Patrick J. Ryan
*Assistant Examiner*—William A. Krynski
*Attorney, Agent, or Firm*—Mueller and Smith

[57] ABSTRACT

The present invention broadly is addressed to the marking, labeling, or tagging of hot metal or hot coils at elevated temperature with human readable and/or machine readable (e.g., bar code) characters. To this end, the present invention broadly is directed to a label which can be secured to hot metal stock (e.g., coil stock) which is at a temperature of up to about 1200° F. The label is formed from a sheet of metal having a face and a back. The sheet face is coated with a layer of paint that is resistant to temperature of the hot metal stock and receptive to being thermally transfer printed. The metal sheet label is of a thickness so that the paint layer can be thermally transfer printed using conventional markers designed for paper or films. Alternatively, this paint layer can be marked upon using conventional dot matrix (wire) printers with carbon ribbon. The layer of paint also bears one or more human or machine readable identification bar code characters which were applied by a thermal transfer or wire matrix printer. The sheet face also has unpainted zones of bare metal for spot welding of the label to the hot stock while hot. While hot or upon cooling of the hot metal stock and label, the human identification characters can be readily read by humans, and the machine readable identification characters can be readily machine read even after exterior storage of the labeled stock for extended periods of time. The paint composition which finds efficacy for use in manufacturing the label of the present invention preferably comprises a phenyl silicone resin, an aluminum stearate extender in an amount effective to provide a gloss for the paint of less than about 35, and opacifying amount of titanium dioxide pigment, and a solvent in an amount for application of the paint composition.

12 Claims, 2 Drawing Sheets

HIGH TEMPERATURE-RESISTANT, THERMALLY-PRINTABLE LABEL FOR ATTACHMENT TO HOT METAL STOCK AND METHOD THEREOF

BACKGROUND OF THE INVENTION

The present invention relates generally to the identification of hot (e.g., 1,200° F.) coils of steel stock, and more particularly to thermally transfer printable labels which can be readily printed and attached to the hot coil stock.

Steel coil, often called "hot bands", are rectangular sheets of steel or metal wound into coils, often with a nominal 30 inch diameter open center and typically weighing about 25 tons. Such steel coils find use in the manufacture inter alia of refrigerators, automobile bodies, and like articles. Parameters influencing the characteristics and available applications of hot bands depend upon, for example, the rolling parameters, chemistry of the steel, and like grade designations. Such grade designations will determine the particular application for which the hot band is suitable. Besides grading the coil stock for determining applications, should a particular part fail, the cause of failure often can be traced back to the chemistry, rolling parameter, or other grade designation which may reveal the cause of the part failure and/or provide information with respect to modification of requirements of the steel for the particular part or its intended use.

Presently, workers often mark hot bands while they are still hot with chalk for generating human readable characters. Alternatively, dot matrix paint characters or articulated sprays also can be used to mark the hot bands. Unfortunately, when the hot bands are stored in large yards, the handwriting or paint generated characters may be upside-down, and the steel may have rusted, obscuring the characters. Human readable characters alone do not facilitate reliable automatic identification. In regard to the marking of hot bands, it will be understood that such steel coils will be at a temperature of about 1200° F. when exiting the rolling line downcoiler where it would be convenient and provide reliable information if marking occurred at such point in the manufacturing operation. Hot coils also have been marked with ceramic-coated metal tags which were printed with a dot matrix printer utilizing carbon impregnated ribbon. Such tags, however, tend to be quite thick, difficult to attach, and are printed with conventional printing equipment which is not amenable to use on the factory floor. Fiberglass tags also have been proposed. Such proposed tags were to be printed with a thermal offset printer, though their attachment to the hot coils was a problem not solved.

Thus, there exists a need to provide machine readable characters on hot bands as well as reliable human readable characters. Moreover, the need extends to marking the hot bands when they are at elevated temperature, say in the neighborhood of 1200° F.

BROAD STATEMENT OF THE INVENTION

The present invention broadly is addressed to the marking, labeling, or tagging of hot metal or hot coils at elevated temperature with human readable and/or machine readable (e.g., bar code) characters. To this end, the present invention broadly is directed to a label which can be secured to hot metal stock (e.g., coil stock) which is at a temperature of up to about 1200° F. The label is formed from a sheet of metal having a face and a back. The sheet face is coated with a layer of paint that is resistant to temperature of the hot metal stock and receptive to being thermally transfer printed. The metal sheet label is of a thickness so that the paint layer can be thermally transfer printed using conventional markers designed for paper or films. Alternatively, this paint layer can be marked upon using conventional dot matrix (wire) printers with carbon ribbon. The layer of paint also bears one or more human or machine readable identification bar code characters which were applied by a thermal transfer or wire matrix printer. The sheet ice also has unpainted zones of bare metal for spot welding of the label to the hot stock while hot. While hot or upon cooling of the hot metal stock and label, the human identification characters can be readily read by humans, and the machine readable identification characters can be readily machine read even after exterior storage of the labeled stock for extended periods of time. The paint composition which finds efficacy for use in manufacturing tile label of the present invention preferably comprises a phenyl silicone resin, an aluminum stearate extender in an amount effective to provide a gloss for the paint of less than about 35, and opacifying amount of titanium dioxide pigment, and a solvent in an amount for application of the paint composition.

Advantages of the present invention include the ability to label the coiled steel stock when it is at elevated temperature. Another advantage is the ability to customize and print tile labels on demand on the manufacturing floor. Another advantage is the ability to provide both human readable mad machine readable identification characters on the label. Yet another advantage is a label that can withstand extended periods of exterior storage and the characters still be readily read. A yet further advantage is the ability to easily affix tile labels to the hot stock by employment of a simple welding technique. These and other advantages will be readily apparent to those skilled in the art based upon the disclosure contained herein.

Figure 1:
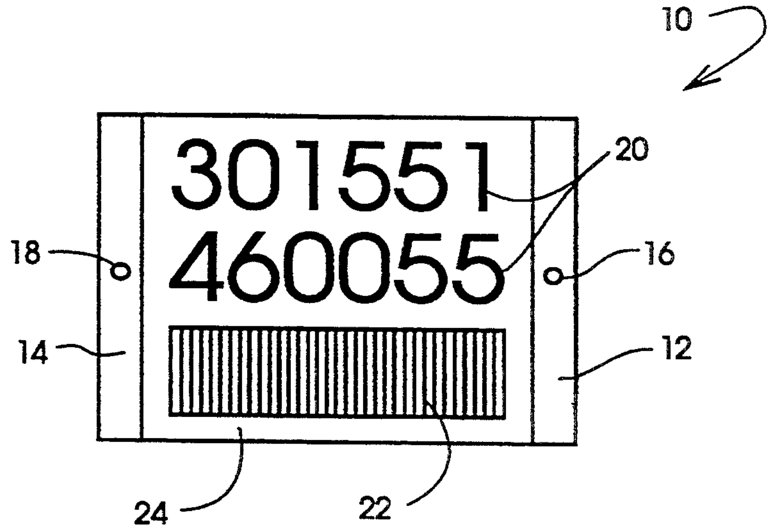
FIG. 1 is a plan view of the inventive label showing a painted area which has been thermally printed with both human readable characters and an optically scanable picket fence printed bar code, and uncoated areas for spot welding of the label.

The drawings will be described in detail in connection with the following description.

DETAILED DESCRIPTION OF THE INVENTION

Hot coils or hot bands typically are at a temperature of up to about 1200° F. At much higher temperatures, ceramic adhesives can be used to affix labels to steel or other metal products, although they may crack upon cooling due to temperature coefficient differences. At temperatures much below about 1200° F., organic adhesives can be used to affix labels to metal products. At about 1200° F., however, neither ceramic nor organic adhesives are appropriate for affixing or securing labels to hot coil stock. One can envision punching holes in the label and then using a wire to secure the labels to the hot coil stock, though the sheer size of the coil stock militates against such means of securement. Thus, the ability to weld, preferably spot weld, the inventive labels to the hot coil stock itself represents an advancement in the tagging of hot coil stock.

Another challenge faced by the label manufacturer is the application of identification information, preferably both human readable and machine readable, to the label. Since the label will almost instantaneously be exposed to a temperature excursion starting with about room temperature and rapidly peaking at about 1200° F., most printing systems are inappropriate and unable to function. Thus, the development of an identification system to be used in conjunction with the metal label also represents a significant challenge with a unique solution being disclosed herein.

With respect to the paint that is applied to the metal label, the ideal time for tagging the hot coil stock is when it is at elevated temperature exiting the rolling (and coiling) operation. Use of conventional thermal transfer printing equipment or wire matrix printers susceptible to use on the factory floor and capable of custom generation of identification indicia would greatly facilitate the tagging operation and acceptability of a tagging system by the hot coil stock manufacturers. Thus, the paint applied to the label must not only be able to be printed with human readable characters, but ideally also with machine readable (e.g., by optical laser beam scanners or the like) indicia. In this regard, the paint must also possess certain characteristics amenable for it to be printed upon as well as the machine readable indicia machine read thereafter. Thus, the paint must not only withstand the 1200° F. processing temperature without decomposition, but it also must possess certain gloss characteristics for machine scanning, adhesion characteristics to the metal stock, surface characteristics for receiving printing, not to mention retention of the paint on the label and identification characters when the coil is stored for extended periods of time outdoors. All of these diverse criteria have necessitated the application of a unique coating system to the label.

Since it is desired that the coated label be thermally transfer printed utilizing conventional thermal printers and transfer tape, the thickness of the metal stock is such that the label can run through a conventional thermal transfer printer. This translates into the label having a thickness desirably ranging from about 0.001 to about 0.004 inches (about 0.25 mm to 0.1 mm). Alternatively, when using a wire matrix printer, the thickness of the label can be increased (at the expense of extra material), say up to about 0.010 inches (0.25 mm). A rectangular shape also is desired for convenience in handling of the label. The rectangular shape also makes the label amenable for use by thermal transfer and wire matrix printers. For welding, preferably spot welding, of the label to the hot coil stock, zones of unpainted bare metal should be provided on the face of the label. While the configuration and location of such bare metal zones can be varied indeed, simply having opposing bare edges of a rectangular metal label is preferred and is easily implemented when the paint is applied to the roll stock in a continuous coating process.

In this regard, FIG. 1 generally shows label 10 to be rectangular in shape and containing uncoated bare metal zones 12 and 14 for enabling label 10 to be affixed to hot coil stock (not shown in the drawing) by spot welds 16 and 18. It will be appreciated that one or more spot welds in each zone can be used as is necessary, desirable, or convenient. Label 10 additionally contains two series of human readable characters, generally identified at 20, and a machine readable picket fence printed bar code, generally identified at 22. The human readable and machine readable identification information has been thermally printed on painted area 24 of label 10. It will be appreciated, however, that use of wire matrix printing or the like also could be used in generating the identification information of painted area 24 of label 10.

Figure 2:
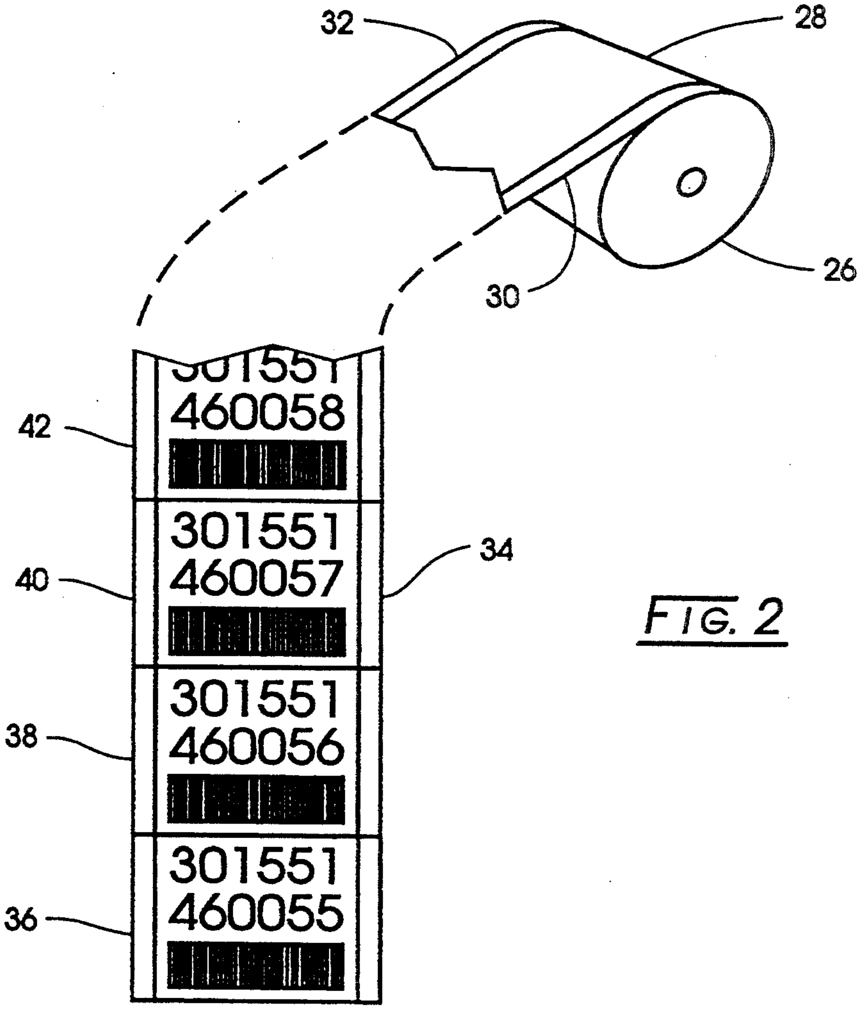
FIG. 2 is a plan view of a roll of painted, plain, label stock which can be custom thermally printed or wire matrix printed for forming the inventive label of the present invention.

Since the thickness and size of the preferred label permits the painted areas to be printed by a conventional thermal transfer printer, a roll of painted continuous label stock conveniently can be used, such as depicted at FIG. 2. Roll 26 of uncut label stock has its center painted as represented at 28 with side edges 30 and 32 uncoated. An end of roll 26 can be fed to a conventional thermal transfer printer (not shown in the drawings) which can generate the human readable and machine readable printing such as generally shown at 34 for labels 36, 38, 40, and 42. End 34 then would be fed through a conventional cutter for severing each of the labels. Thus far, it will be appreciated that the formation and application of the label is keyed towards easy use by factory workers.

Thermal transfer printing is conventional and is a direct printing process where a thermal energy source is used to transfer colorant material from a carder surface to a plain surface. Thermal energy sources range from focused laser beams to arrays of resistive heating elements. This printing technique is well known in the art. Further details of such technique can be found, for example, by reference to J. L. Johnson, *Principles of Non Impact Printing*, Peletina Press, pp 325 et seq. (1986), the disclosure of which is expressly incorporated herein by reference.

Wire matrix printers also are conventional and typically have a printer head with multiple (e.g., nine) hammers, each of which is a thin (e.g., 0.33 mm diameter) metal wire. The wires are activated in accordance with information received from a character generator so that a desired character can be printed in a, e.g., 5×7 array of dots. The wires strike a ribbon and the print head is positioned on a carrier. Printing is done while the carder is in continuous motion. Further details of such technique can be found, for example, by reference to Fink & Christiensen, *Electrical Engineers Handbook*, Third Edition, McGraw Hill Book Company, pp 23-70 through 23-72 (1989), the disclosure of which is expressly incorporated herein by reference.

Figure 3:
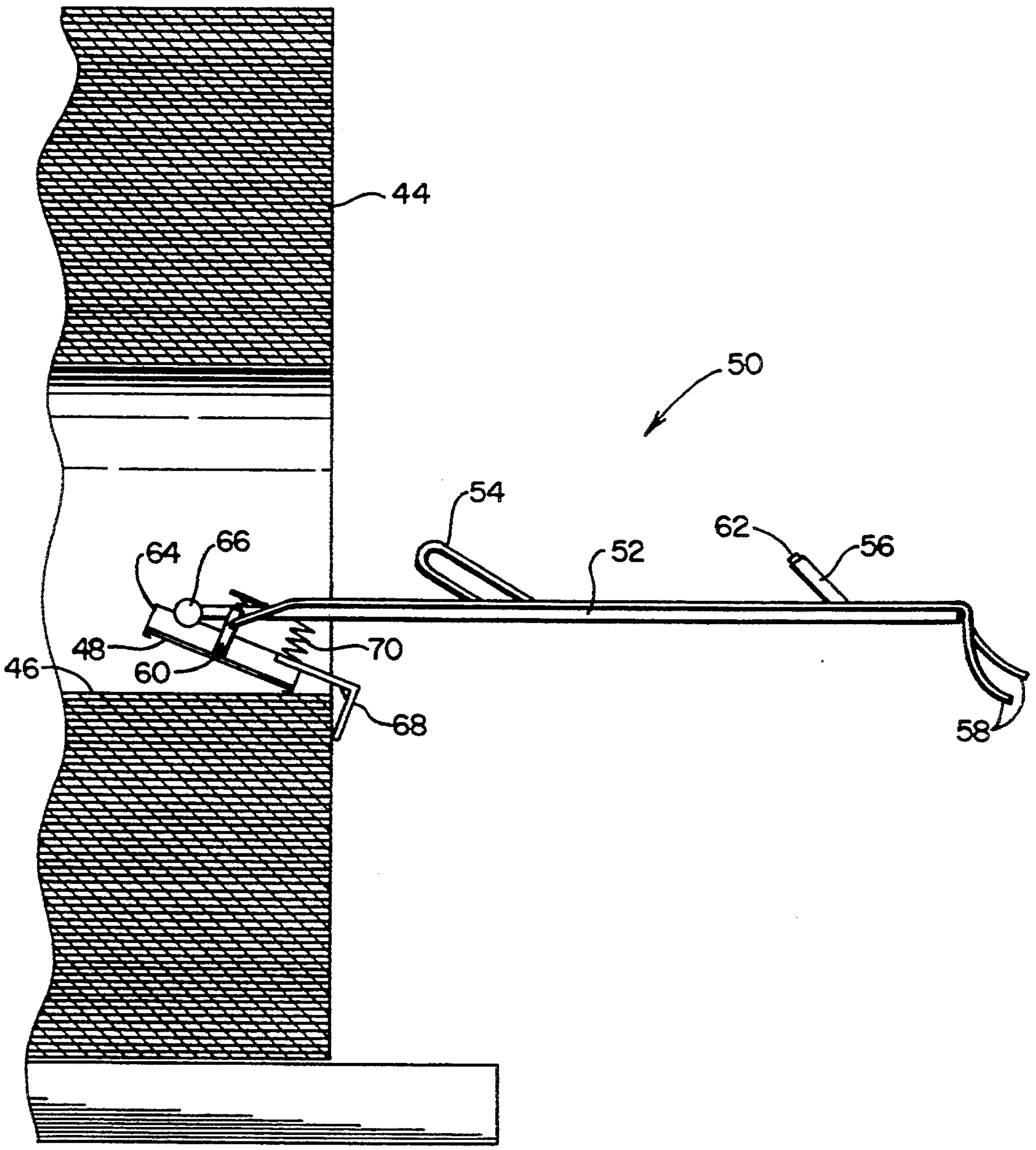
FIG. 3 is a side elevational schematic representation of an applicator for welding of the inventive label to a steel coil.

Further in this regard will be appreciated a representative applicator for securing the label to hot metal stock as such applicator is depicted at FIG. 3. Hot metal stock 44 is seen to include interior surface 46 upon which label 48 is to be secured. The applicator, generally shown at 50, is seen to include wand 52 which has grab ring 54 and handle 56 for the operator to hand grasp. Electrical lines 58 supply power to welding electrode 60. Button 62 on handle 56 actuates welding electrode 60 (and others not seen in the drawing).

Label 68 is secured by the lips of holder 64 which is attached to wand 52 by hinge 66. Extension 68 locates holder 71 with respect to the edge of coil 44 so that tag 60 can be placed onto surface 46. Spring 70 supplies pressure of label holder 64 against surface 46 so that the operator can actuate electrode 60 (and other electrodes not shown, but which form the spot welding pattern) via button 62 for spot welding label 68 onto surface 46 of hot coil stock 44. It will be appreciated, however, that a variety of additional applicators, including automated or robotic equipment, can be envisioned readily for use in welding the novel label to hot metal stock.

With respect to the paint that is used for coating a portion of the face of the novel label, the binder comprises a phenyl silicone resin which provides stability at the elevated temperatures to which the label is subjected. Silicone resin binders typically are heat cured in the presence of catalysts with typical catalysts being selected from acids, bases, and the salts of metals, for example, zinc, tin, lead, or chromium octoates. Silicone resins can be blended or chemically combined with other film-forming polymers provided that the ultimate cured phenyl-substituted silicone binder is stable at the hot metal temperatures of use of the inventive labels. Phenyl-substituted resins are well known in the art, such as represented by D. H. Solomon, *The Chemistry of Organic Film Formers,* Second Edition, Robert E. Krieger Publishing, Inc., pp 334 et seq. (1977), the disclosure of which is expressly incorporated herein by reference. It should be understood, however, that certain polyimide resins also are stable at the temperatures of operation and similarly can be used in formulating a paint for use in the present invention.

The next ingredient in the paint or coating composition is an aluminum stearate extender which is included in the paint composition in an amount effective to provide a gloss for the paint of less than about 35. Gloss is measured, for present purposes, with a 60° gloss meter. Gloss control is primarily important in that high gloss paints are too smooth for reliable thermal transfer printing. Gloss control also is important for optically scanning the characters printed on the painted surface of the novel label (spectral reflection is reduced with high gloss). Aluminum stearate is reported to "burn out" at a lower (viz., lower than 1200° F.) temperature, but still can be used at the elevated temperatures of operation in order to achieve gloss control.

An opacifying amount of titanium dioxide pigment also is included for providing opacification as well as a white color to the paint, again so that the contrast between the characters and the background of the paint enables optical scanning. Titanium dioxide pigment is stable at the elevated temperatures of operation.

Finally, a suitable solvent for the resin is included in an amount corresponding with the desired method of applying the paint to the metal label with the viscosity required for application of the paint composition being an important factor in selection of the type and amount of solvent. Xylol is a conventional solvent which has been used and the amount conveniently is appropriate for achieving a viscosity suitable for spray application of the paint to the metal label, though a variety of other organic solvents could be used as is necessary, desirable, or convenient.

The preferred paint conveniently can be subjected to solvent expulsion conditions at about 250° for up to about two hours or longer after, for example, a ten minute room temperature flash off followed by baking at about 600° F. for 30 minutes. This promotes good adhesion to the metal which desirably has been subjected to surface preparation as is recommended by all paint manufacturers. Surface preparation can include, for example, surface polishing and solvent wipe in conventional fashion. Multiple layers of the paint also can be used as is necessary, desirable, or convenient. A representative paint with phenyl silicone resin binder which is found to be quite advantageous for use in the present invention is Plasti-Kote X-7443 paint (Plasti-Kote Company, Inc., Medina, Ohio).

It should be appreciated that besides marking metal coil stock, the inventive labels can be used to mark a variety of hot (up to about 1200° F.) metal products. It further will be appreciated that the description herein is illustrative and not limitative of the present invention. All citations referred to herein are expressly incorporated herein by reference.

We claim:

1. A label which can be secured to hot metal stock which is at a temperature of up to about 1,200° F., which comprises:

a sheet of metal having a face and a back, (i) the sheet face being coated with a layer of paint that is resistant to the temperature of the metal stock and receptive to being thermally printed, said paint having a gloss of less than about 35;

(ii) the metal sheet being of a thickness so that the paint layer can be thermally transfer printed;

(iii) the layer of paint bearing one or more of human or machine readable identification characters which were applied by a thermal printer; and (iv) the sheet face having unpainted zones of bare metal for welding of the label to the hot metal stock.

2. The label of claim 1, wherein the label is between about 0.001 and 0.004 in thick.

3. The label of claim 1, wherein said paint layer is white in color.

4. The label of claim 1, wherein said paint layer contains human readable characters and a machine readable bar code.

5. The label of claim 1, which is spot welded to the surface of hot metal stock.

6. The label of claim 1, which is thermally printed from a continuous roll of labels which thereafter are severed for securing to hot metal stock.

7. The label of claim 1, wherein said label is rectangular in shape and opposing side edges of the face are the unpainted zones.

8. The label of claim 1, which is made from steel.

9. The label of claim 1, wherein said paint is cured from a paint composition, which comprises:

(a) a phenyl silicone resin;

(b) an aluminum stearate extender in an amount effective to provide a gloss for the paint of less than about 35;

(c) an opacifying amount of titanium dioxide ($TiO_2$) pigment; and (d) solvent in an amount for application of the paint composition.

10. The label of claim 9, wherein said solvent comprises xylol and is present in an amount for spray application of the paint composition.

11. Metal stock having the label of claim 1 welded thereto.

12. The label of claim 1, wherein said hot metal stock comprises hot metal coil stock.

* * * * *